Figure 1:
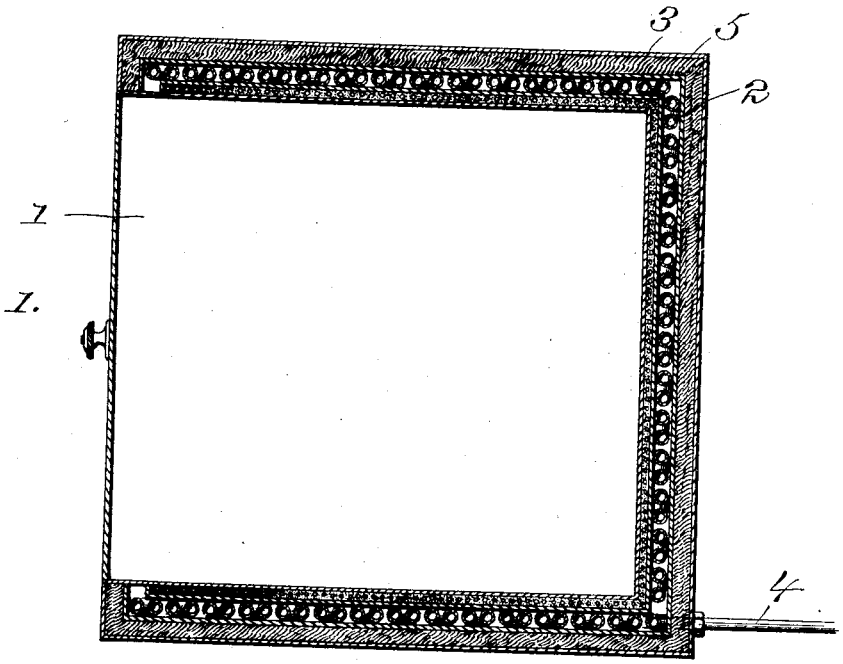

No. 670,668.

W. S. HADAWAY, JR.
APPARATUS FOR BAKING.
(Application filed Feb. 1, 1899.)

Patented Mar. 26, 1901.

(No Model.)

WITNESSES:
Oscar O. Seyfert
Charles Francis Camp

INVENTOR
William S. Hadaway, Jr.
BY
H. S. Mackaye
ATTORNEY

UNITED STATES PATENT OFFICE.

WILLIAM S. HADAWAY, JR., OF NEW YORK, N. Y.

APPARATUS FOR BAKING.

SPECIFICATION forming part of Letters Patent No. 670,668, dated March 26, 1901.

Application filed February 1, 1899. Serial No. 704,087. (No model.)

*To all whom it may concern:*

Be it known that I, WILLIAM S. HADAWAY, Jr., a citizen of the United States, residing in the city, county, and State of New York, have invented a certain new and useful Improvement in Apparatus for Baking, of which the following is a specification.

My present invention relates to an improved means for baking, roasting, or similar operations wherein a more or less moist body is intended to be treated.

My apparatus may be applied to a number of different arts, such as cooking, baking ceramics or shellacked articles, and the treatment of rubber for various purposes.

It is to be understood that while I have herein shown and described a form of oven adapted to culinary uses I am not limited to a device entirely surrounded by the heating means, the term "oven" being intended to cover any containing vessel within which the baking process may be conducted.

The baking of moist articles may be logically considered as divided into two stages. In the first stage the moisture is driven off. In the second the true baking or conversion to new form by high temperature is accomplished. In the first stage the escape of moisture by evaporation absolutely limits the temperature usefully applied and at the same time calls for a large quantity of heat or a great number of thermal units. Thus a source of heat supplying great quantity at a low temperature or potential is required at this first stage of the process. After expulsion of moisture and consequent cessation of absorption of latent heat by evaporation the process of baking takes on a totally different aspect. In the second stage a relatively higher temperature is required and a relatively small quantity of heat as measured in thermal units is employed. Hitherto it has been customary to apply thermal energy to baking-ovens at a potential sufficient to carry out the requirements of this second stage of baking, and in culinary practice where a large surplus of heat is required for simultaneous employment for other purposes, as boiling, &c., this is compatible with application of the heat in great quantity, as well as at high potential, as by the direct use of burning fuel surrounding the oven. Where, as in electrical practice, isolated ovens are employed solely for baking, however, the employment of thermal energy at a high initial potential over the whole period of time employed in baking causes a great waste, which it is the province of my present invention to avoid. It is evident that if thermal energy be applied at a high initial potential or temperature but relatively small quantity during the preliminary stage in the baking process the long time devoted to this preliminary stage will involve great waste of heat by radiation. This is rendered a doubly-serious objection in that the unnecessarily-high potential applied increases the rapidity of the radiation itself. This is so great an obstacle to baking in isolated ovens by means of the heat liberated by electric conductors that in many instances the process of baking by electricity, except on a very small scale, has been found to be totally impracticable.

The main object of my invention is to provide an electric heater or baker constructed with due reference to the scientific principles above explained and wherein the objections above pointed out are obviated.

Another object of my present invention is the provision of a form of apparatus for the above-named purpose which shall permit as little escape of heat through radiation as possible.

My invention is illustrated in the accompanying drawings, wherein—

Figure 2:
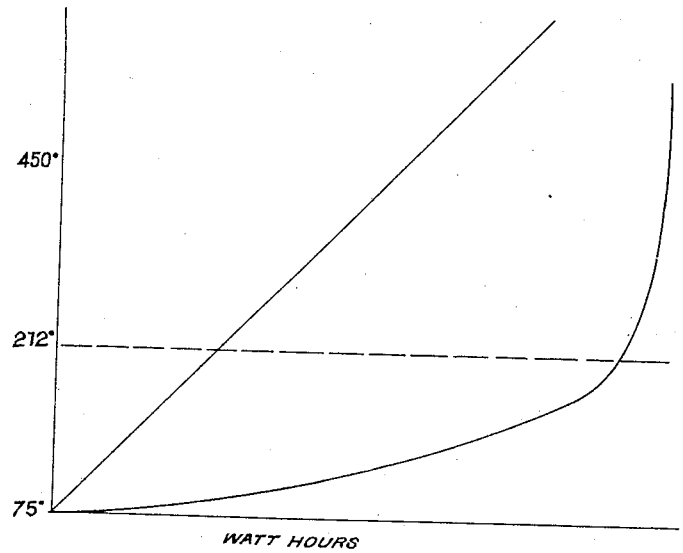

Figure 1 is a transverse vertical section of one form of electrical oven embodying the principles of my improved apparatus, and Fig. 2 is a diagram illustrating the different results obtained with and without the employment of my invention.

In Fig. 1 I have shown the application of my improved process to an electric oven wherein the electric energy is converted into thermal energy for the purpose of baking as generally understood. The baking-chamber is shown at 1, and around this chamber I place an electric heater 2, preferably surrounding the baking-space save at the doorway. This heater may be constructed in a variety of ways, which I have typified simply by showing electric conductors insulated from the conducting portions of the oven. The electric heater is surrounded in turn by a steam-space 3, to which steam is admitted, as at 4, either through a system of steam-pipes, as illustrated typically, or otherwise, according to the judgment of the manufacturer. The whole exterior of the oven is then preferably protected by means of a suitable jacket of mineral wool or other relative insulator of heat, as indicated at 5. The operation of this apparatus is as follows: The steam is first admitted into the appropriate space 3, either in the form of live steam—say at 300° Fahrenheit—or as exhaust-steam at about 212° The thermal energy imparted by means of the steam is of low potential, but of great quantity, partly because the latent heat which it carries represents many units of thermal energy not sensible in the form of high temperature. The potential of this steam is, however, ample for carrying on the preliminary stage of the baking process, and the loss of heat from the isolated oven through radiation will be the less in proportion as this potential is low and the rapidity of action due to large quantity of thermal output is high. The former item decreases the radiation by lessening its intensity of action or rapidity, and the latter item has the same effect, due to the lessened time elapsing before completion of the drying stage of the baking process. At or about the time of completion of the preliminary stage described the electric current is admitted to the heater 2, and the high-potential energy is permitted to operate upon the material to be baked.

I do not limit myself to the process which involves the initiation of the high-potential-energy output at the end of the preliminary stage of baking. It will take some time in any event for the full temperature to develop after the current has been turned on, and in most cases it will be found expedient to admit the electric current and the steam together. In any case the high-potential form of heat finds by far the greater part of the total work provided for by the low-potential factor, and in building up the necessary temperature the high-potential element has only to build up from the base established by the low-potential factor. The time consumed in reaching the necessary temperature at the mass to be baked as distinguished from the temperature of the wires 2 merely is greatly shortened and the loss of heat from the wires by useless radiation is also lessened proportionately.

The difference in actual practice and the great saving occasioned by the use of my process are illustrated graphically in a typical diagram in Fig. 2. This shows a type of heating-curves actually observed in practice with electric ovens, the lower curve representing the rate of heating where the electric oven is used without any low-potential factor and the upper curve representing the same rate where the low-potential element is employed. In this figure the vertical distances or ordinates represent temperatures, commencing with, say, 75° Fahrenheit as the origin of ordinates. The abscissæ represent watt hours or other appropriate units denoting the product of rate of thermal work by time. Now the lower curve shows plainly that where the old forms of electric oven are used in baking there is a considerable period of time during which the result in rise of temperature is indicated by a low-lying line reluctantly rising to the limit of about 212°. Once this point is reached, the curve trends sharply upward, indicating the initiation of a stage of the process during which small expenditure of thermal energy, represented by abscissæ, corresponds to relatively great results in rise of temperature. As it is this rise in temperature which accomplishes the necessary chemical changes in the material baked, it will be seen that practically all the actual roasting or useful transformation of the material acted on occurs in the shorter stage of work and corresponds to a relatively small output of energy. If, however, my combination of steam-jacket with electric heater is employed, the useful transformation is greatly accelerated, as is indicated by the upper line in the figure, which rises almost straight toward the ultimate goal to be attained.

The graphic representation in Fig. 2 makes it clear that energy is saved by my system in the lessened number of watt hours employed for obtaining the given result; but there must be added to this the benefit derived from the fact that the radiation in the lessened time employed is less; but there is a still further gain due to the particular apparatus employed by me, in that it greatly reduces the rapidity of the radiation. Where the electric oven is used alone, as heretofore, the radiation rate is determined by the actual temperature of the wires, which is very high. Were the steam-chamber used alone, this rate of radiation would be that corresponding to the relatively low temperature of the steam. Where, however, the electric heater is surrounded by the steam-chamber, the condition will be somewhere between the two conditions above mentioned. If relatively wet steam be used and kept in circulation, the heat energy radiated from the electric heater will be stored up in the steam and may become beneficial in other portions of the steam system. This will be determined by the peculiar conditions attending each case. If, on the other hand, dry superheated steam be used, it will act as one of the most efficient heat jackets or insulators known, and thus tend to reduce the outward radiation of the electrically-generated heat. It will therefore be understood that I do not prefer that form of steam-space shown, wherein pipes are used, but have illustrated that form as more clearly indicating in the drawings the function of the space in question.

I do not wish to be understood as limiting myself to the precise details herein shown and described. Certain departures therefrom are indicated above, and others will occur to those skilled in this art, which may be adopted without departing from the scope of my invention.

What I claim is—

1. In an oven, a baking-space, an electric heater surrounding the same, and a steam-space surrounding the baking-space and the electric heater.

2. In an oven, a baking-space, an electric heater surrounding the same, a steam-space surrounding the baking-space and the electric heater, and a jacket composed of a relative heat-insulator surrounding the whole.

WILLIAM S. HADAWAY, Jr.

Witnesses:
BENJAMIN A. GOULD,
HAROLD S. MACKAYE.